United States Patent
Link, II (10) Patent No.: US 8,818,695 B2
(45) Date of Patent: Aug. 26, 2014

(54) METHOD FOR REPORTING TRAFFIC CONDITIONS

(75) Inventor: Charles M. Link, II, Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 340 days.

(21) Appl. No.: 12/711,172

(22) Filed: Feb. 23, 2010

(65) Prior Publication Data

US 2010/0217480 A1     Aug. 26, 2010

Related U.S. Application Data (60) Provisional application No. 61/154,708, filed on Feb. 23, 2009.

(51) Int. Cl.
*G08G 1/00* (2006.01)
*G08G 1/01* (2006.01)

(52) U.S. Cl.
CPC .................... *G08G 1/0104* (2013.01)
USPC ........... 701/118; 701/117; 701/119; 701/414; 701/423

(58) Field of Classification Search
CPC ........................................ G08G 1/0104
USPC ........................................ 701/33, 117, 119
See application file for complete search history.

(56) References Cited

U.S. PATENT DOCUMENTS

| | | | |
|---|---|---|---|
| 5,164,904 A * | 11/1992 | Sumner | 701/117 |
| 6,728,631 B1 * | 4/2004 | Hessing | 701/409 |
| 6,747,692 B2 | 6/2004 | Patel et al. | |
| 7,043,357 B1 * | 5/2006 | Stankoulov et al. | 701/446 |
| 7,218,758 B2 | 5/2007 | Ishii et al. | |
| 7,532,859 B2 | 5/2009 | Videtich | |
| 2003/0030445 A1 | 2/2003 | Baader et al. | |
| 2005/0099322 A1 * | 5/2005 | Wainfan et al. | 340/995.13 |
| 2005/0216302 A1 | 9/2005 | Raji et al. | |
| 2008/0255888 A1 * | 10/2008 | Berkobin et al. | 701/29 |
| 2008/0303693 A1 * | 12/2008 | Link, II | 701/117 |
| 2009/0015590 A1 * | 1/2009 | Hara et al. | 345/522 |
| 2009/0202102 A1 | 8/2009 | Miranda et al. | |
| 2012/0046819 A1 | 2/2012 | Agrawal et al. | |

OTHER PUBLICATIONS

Ammoun, et al., "Real Time Trajectory Prediction for Collision Risk Estimation Between Vehicles," IEEE 5th International Conference on Intelligent Computer Communication and Processing, (ICCP 2009), pp. 417-422, Aug. 27-29, 2009.

(Continued)

*Primary Examiner* — Ryan Zeender
*Assistant Examiner* — Hunter Wilder (57) ABSTRACT

A targeted area audio distribution system for Satellite Digital Audio Radio Services Receivers ("SDARS") provides specific content to listeners based on location. A service provider can facilitate delivery of local content using a telematics device installed in the listener's vehicle. The telematics device uses a content database indexed on an identifier formed from coordinates of a desired geographical area to target particular content for users in a targeted area as small as a few blocks. In addition, interstate drivers can receive location specific advertisements for exits that they may be approaching. Digital audio content can be queued up for insertion into the audio stream based on specific locations. The identifier can also be used to report vehicle performance information from a plurality of vehicles to facilitate providing real-time traffic conditions for many traffic corridors.

2 Claims, 6 Drawing Sheets

(56) References Cited

OTHER PUBLICATIONS

Ammoun, et al., "Real-time Crash Avoidance System on Crossroads Based on 802.11 Devices and GPS Receivers," IEEE Intelligent Transportation Systems Conference, (ITSC '06), pp. 1023-1028, Sep. 17-20, 2006.

Bachir, et al., "Towards Supporting GPS-Unequipped Vehicles in Inter-vehicle Geocast," 28th Annual IEEE International Conference on Local Computer Networks (LCN '03), pp. 766-767, Oct. 20-24, 2003.

Bazzani, et al., "Towards Congestion Detection in Transportation Networks Using GPS Data," IEEE 3rd Int'l Conference on Privacy, Security, Risk and Trust (PASSAT) & IEEE 3rd Int'l Conference on Social Computing (SocialCom), pp. 1455, Oct. 9-11, 2011.

Liu, et al., "Risk Rank and Emergency Management of Major Hazard Installations for Highway Tunnel Construction," 2nd IEEE International Conference on Emergency Management and Management Sciences (ICEMMS), pp. 228-231, Aug. 8-11, 2011.

Quintero, et al., "Intelligent Driving Diagnosis System Applied to Drivers Modeling and High Risk Areas Identification. An Approach Toward a Real Environment Implementation," IEEE Conference on Vehicular Electronics & Safety, pp. 111-116, Jul. 24-27, 2012.

Rong, et al., "Research on Safety Driving Assistant System of Expressway On-ramp Merging Area Based on Wireless Network Communication," Eighth International Conference on Machine Learning and Cybernetics, vol. 6, pp. 3139-3144, Jul. 12-15, 2009.

Samaranayake, et al., "Evaluation of Safety Risks at Railway Grade Crossings: Conceptual Framework Development," IEEE International Conference on Quality and Reliability (ICQR), pp. 125-129, Sep. 14-17, 2011.

\* cited by examiner

* OPTIONAL – COMBINED IDENTIFIER CAN ALSO INCLUDE DEMOGRAPHIC CODE VALUES

FIG. 8

METHOD FOR REPORTING TRAFFIC CONDITIONS

CROSS REFERENCE TO RELATED APPLICATIONS

This application claims priority under 35 U.S.C. §119(e) to U.S. Provisional Patent Application No. 61/154,708 entitled "Method and system for providing targeted marketing in an SDARS network" to Charles M. Link, II, filed on Feb. 23, 2009.

FIELD

This invention generally relates to entertainment devices, and more specifically to an SDARS media entertainment receiver generally installed in vehicles. The methods configure a telematics central computer and telematics devices in the vehicles to provide audio and video content in the vehicle based on the location of the vehicles.

BACKGROUND

Audio content distribution is a highly competitive market. There are local radio stations broadcasting their content, nationally syndicated broadcast networks broadcasting content of national interest and satellite radio services that are broadcasting content that is mass distributed to listeners region and nationwide. Content is geared to the market that it can be received in—local content is generally of interest to a small locale where national content is generally of interest to a much wider area. Much of the content is listener supported through advertising. Without advertising, even the pay content channels would be prohibitively expensive (for typical programming).

The problem with advertising is that it should be universally applicable to all listeners for a national distribution model. It would be cost-prohibitive for "Bob's Car Wash" to advertise on a nationally syndicated program if the business was located in Abilene, Tex. Nationally syndicated programs broadcast by a local terrestrial broadcast transmitter solve this problem by inserting local advertisements into the audio stream. This allows local advertisers to achieve the advertising they desire in highly coveted time slots on local stations without paying for advertising on a national level. Further, for the broadcaster, both the syndicated programmer and the local "transmitter owner", it allows for a wider range of advertisers. After all, it may not be that easy to find advertisers who desire, or can afford, advertising on a national basis.

Even terrestrial broadcasters find the need for location based content. Many FM radio stations and some AM broadcast stations find themselves broadcasting to ever widening audiences. An example of this problem can be found in any major metro area where these stations attempt to grab a significant portion of the radio listeners in the area. Further, these "superstations" have positioned their transmitting antennas to have the widest possible coverage. In many cases, these superstations have created larger broadcast areas by purchasing multiple stations and "simulcasting" local content among two or more broadcast transmitters, with each broadcasting exactly the same content. Certainly this has its advantages, but it limits advertisers to businesses with huge marketing budgets, typically with multiple locations. Smaller local advertisers are almost locked out of the radio market for all but medium-powered AM broadcast stations.

SUMMARY

To effectively deliver advertising to the desired audience, advertisers primarily consider location and demographics. As an example in print advertising, a power tool vendor would probably not attempt to advertise his wares in *Ladies Home Journal* and a manufacturer of hearing aids probably would not advertise his wares in *Teen* magazine. Advertisers target a market to make effective use of their resources. As print media becomes less and less attractive due to declining readership, audio, video and web based media become more attractive. Each media outlet vies for a portion of an advertiser's advertising money, and as more creative methods of distribution are developed, each media outlet finds its share of the total advertising pie decreasing. Web based advertising certainly has captured its share of advertising money while using services like DoubleClick to target the appropriate audience.

An audio outlet competes without making the product less attractive for the consumer of the media and still attract necessary money to operate and grow by closely targeting its listeners with advertising geared toward the consumer. The advertiser begins with analyzing the media programming content to determine the demographics of the listener. Classical music my attract a more affluent and perhaps older population, while classic rock may attract a middle aged male population, and hip-hop may attract a younger population with a propensity to spend more on technology gadgets and fad-related products. However, listeners to the same content in Maine may not have the same values, preferences, and interests as someone listening to the same content in San Diego. The present application discloses a method and system for targeting marketing nationally, yet with flexibility that allows the marketer to target an intended demographic in a given geographic location. The method and system described here merges the available resources of a wide area audio distribution system (either terrestrial or satellite based) along with global positioning satellite ("GPS") technology to deliver targeted content to the listener at the lowest possible price points and perhaps leverages the technology that might already exist to do this. It becomes possible to utilize the unused capability of an "automatic crash notification" [ACN] telematic device to deliver very accurate and targeted content.

Today, vehicles are equipped with a variety of safety, information and entertainment electronics. Almost every vehicle manufactured today contains some type of radio receiver for entertainment. Though all of those receivers contain capability to receive AM and FM broadcasts on the standard frequencies used for that purposes, many now contain Satellite Digital Audio Receiver System ("SDARS") receivers that receive digital data streams containing many audio entertainment and digital information streams. The typical SDARS receiver in the U.S. will receive about 12 million bits per second which may or may not be wholly broadcast from a high power satellite. Depending on the exact system and network engineering, some portion of the SDARS bandwidth may be received from terrestrial stations, sometimes referred to as repeaters, to offer better signal coverage and allow penetration in the urban canyons of the typical metropolitan city. Though not currently allowed under the current SDARS licensing structure, some portion of the content could contain locally generated programming (advertising) or data.

AM and FM broadcasters are working to adapt to more advanced technologies to remain competitive. One of the latest inventions in the broadcasting field is digital transmission technologies that utilize similar bandwidths and deliver higher quality content. The technologies, whether analog or digital can support distribution of alternate content aside from the main audio channel.

Among the safety devices commonly installed in many passenger vehicles are wireless communication and location determining devices that can be used to report crashes and other roadway emergencies as well as concierge services. These devices, which some refer to as "telematics" devices, generally contain a wireless communications device such as a cellular or PCS communications device and a GPS circuit, and in many cases may contain accelerometers for automatic crash detection. Upon detection of a crash, or operation of a user pushbutton, the telematics device initiates a wireless call, or a digital message, to an operator who can notify the local public safety access point as to the event as well as the address or map location of the event. This functionality is well known and established within the automotive industry. It is a popular option that is included on several automobile manufacturers' vehicles.

Combining the entertainment equipment with the information equipment and the telematics equipment is a logical step in the evolution of electronics for automobiles. Utilizing the synergies of the GPS, display screen, wireless phone and entertainment system, a perfect next generation "infotainment" system is created. This infotainment system delivers the capability for building the perfect marketing system to target advertising to listeners of digital audio content from SDARS, other satellite, or terrestrial AM and FM broadcasts.

Existing technology systems might target a customer based on a distance from a given point, as determined by UPS. Another solution might offer only enough granularities to target customers in a city, state or region. The solution described in the present application can target all customers who routinely travel down a particular road, or to a particular shopping center.

The aspects described herein create a targeted marketing solution that evaluates the vehicle location in real time and subsequently selects preloaded, or previously downloaded, audio snippets, or audio files.

DETAILED DESCRIPTION

The present invention may be embedded in telematics control unit installed in target vehicles. In particular, an entire fleet of one, or more, manufacturer's vehicles may be equipped with the described telematics control units. In the ideal implementation of this invention, all system and subsystems of the telematics unit are contained within a single box, and controlled with a single core processing subsystem, but this is by no means the only implementation. Each of the components of the telematics control unit can be separate subsystems of the vehicle, for example, the SDARS or AM/FM receiver can be a separate entity contained within the entertainment radio of the vehicle and the GPS can be a separate entity contained within the vehicle navigation system. The ideal embodiment would capitalize on the synergies of each of the electronics subsystems to minimize the VTUTMD cost and hence overall vehicle cost.

Figure 1:
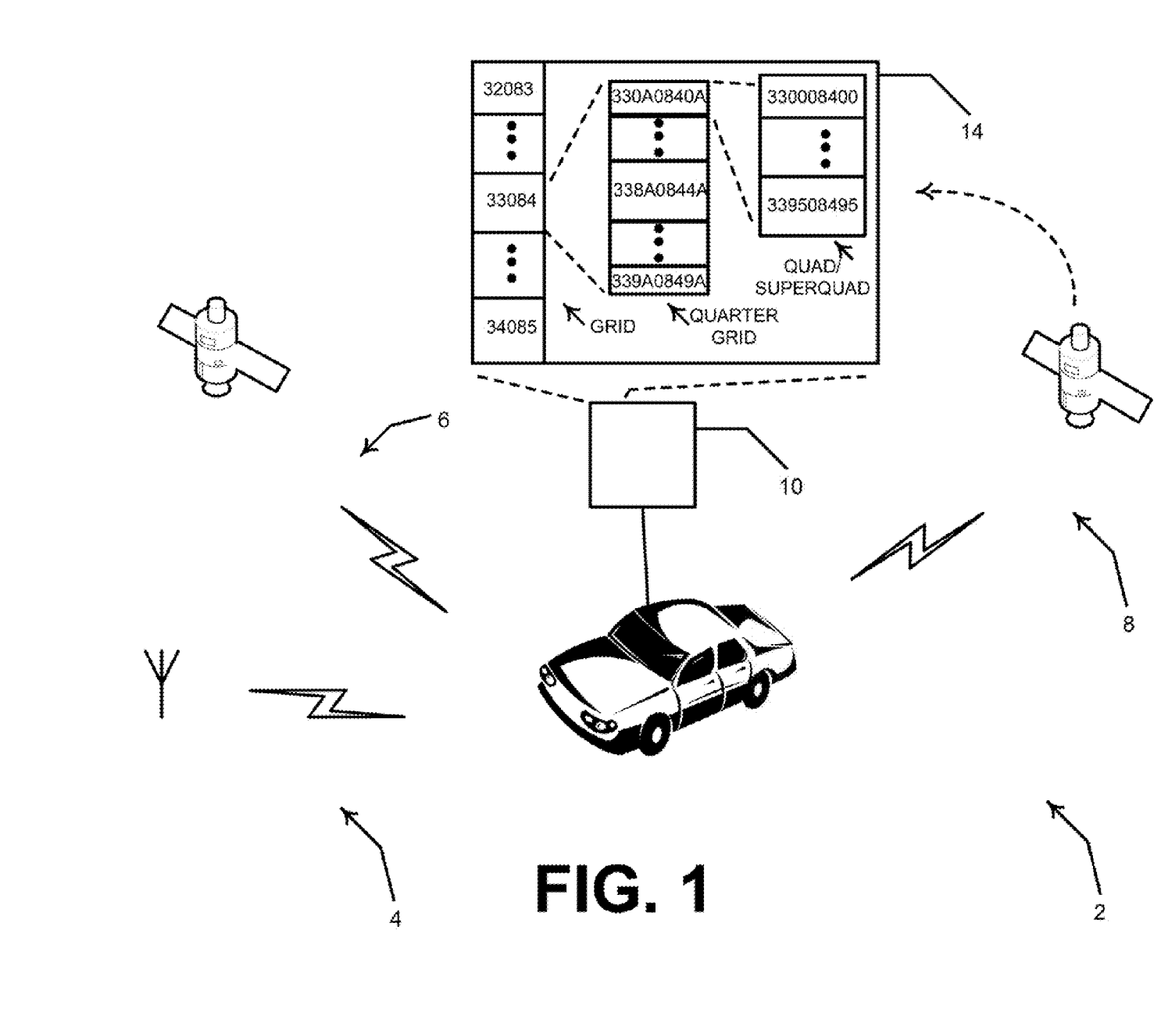
FIG. 1 illustrates the block diagram of a system for processing SDARS broadcasts.

The present application may refer to the device illustrated in FIG. 1 as a "vehicle telematics unit and targeted marketing device" ("VTUTMD"). Alternatively, this application may refer to device 10 as a vehicle telematics unit, or a telematics unit. Referring to FIG. 1 above, system 2 includes three separate RF subsystems. The first subsystem is the PCS/Cell Modem network 4. Its typical purpose is for communicating crash information and perhaps other telematics functions, and is not required for the delivery of services by various aspects described in the present application. Network 4 can operate on any frequency available in the country of operation, and more specifically, in the U.S. markets, it could operate on the standard 850/1900 MHz cellular and PCS frequency allocations. The type of communications can be, but is not limited to, GPRS, EDGE, UMTS, 1×RTT or EV-DO. Alternately the modem could be a Wi-Fi or mobile WIMAX implementation that could support operation on unlicensed wireless frequencies. An aspect utilizes the central processor to control and operate the baseband wireless communications chips.

The second subsystem 6 includes a GPS receiver receiving position information from a constellation of satellites operated by the U.S. Department of Defense. Alternately the receiver could be a GLONASS receiver operated by the Russian Federation Ministry of Defense, or any other positioning device capable of providing very accurate location information [LORAN, inertial navigation, etc]. In the preferred embodiment, this GPS receiver contains additional logic, either software, hardware, or both, to receive the Wide Area Augmentation System [WAAS] signals, operated by the Federal Aviation Administration, to correct dithering errors and provide the most accurate location possible. Overall accuracy of the positioning equipment subsystem containing WAAS is generally in the 2 meter range and contributes to the viability of the system. Optionally, the telematics solution can contain a MEMS, or piezo electronic gyro, or other angular rate sensor for measuring angular rates and wheel tick inputs for determining the exact position based on dead-reckoning techniques. This functionality is useful for determining accurate locations in the metropolitan urban canyons, heavily tree lined streets and tunnels.

In the preferred implementation, the third subsystem could contain an SDARS receiver or digital "In Band On Channel" [IBOC] AM/FM broadcast transmitter. SDARS utilizes high power satellites operating at 2.35 GHz to broadcast digital content to automobiles and some terrestrial receivers, and the signal is generally demodulated for audio content, but could alternately contain digital data streams that could be used to update the onboard databases contained within the VTUTMD.

Other solutions for providing database updates include using. FM subcarrier, cellular data download, digital content on IBOC stations, other satellite technologies, or Wi-Fi etc. Though all would yield a satisfactory system, SDARS or IBOC data downloads provides the most flexibility and lowest cost by obtaining digital data through an existing receiver already installed for the purpose of audio entertainment. In the preferred embodiment, the SDARS data stream is typically not a channelized implementation (like AM or FM radio), but a broadband implementation that provides a single data stream that is separated into the useful and applicable components. In the ideal implementation, a component of interest to the occupants of the vehicle is entertainment audio, traffic data, or weather data etc. However, an advertiser may also be interested in simultaneously extracting marketing area of interest database updates from the data stream. Additionally, using advanced coding techniques, IBOC digital radio supports multiple digital program channels within the bandwidth reserved for the single channel audio. Called "Tomorrow Radio", this and other similar techniques should demonstrate the feasibility of using an alternate source for targeted content delivery, to be stored and played back on request by the onboard processing system.

In the preferred embodiment, a processor inside the VTUTMD 10 controls the various communications and position RF subsystems. In this implementation, the control processor would have attached SDRAM and FLASH memory containing the operating software and necessary high speed random access memory for containing temporary audio storage and scratchpad memory. This core processor can control additional peripherals within the VTUTMD for offering the highest integration while maintaining the lowest cost for the vehicle manufacturer. In this embodiment, the processing core controls the power to the components within the VTUTMD, shutting off GPS and SDARS receiver when the vehicle is inactive, and alternately turning off the wireless phone to conserve the vehicle battery when the vehicle is stationary for long periods of inactivity. In the preferred embodiment, the processor core controls the audio subsystem and contains a stereo codec and multiplexer for processing and presenting to vehicle occupants entertainment audio wireless communications audio (cell/PCS communications audio), speech recognition from the driver compartment for manipulating the SDARS receiver and cell/PCS phone dialing, and text to speech and canned audio for vehicle status annunciation. Additional communication with the driver for normal activities can occur through the infotainment radio head unit, which typically attaches to a vehicle's CAN (controller area network) bus.

The core processor normally monitors the accelerometers, or optionally communicates with the airbag deployment computer for crash notifications. The additional functionality of targeted marketing content delivery does not necessarily overburden the core processor. Ideally, the core processor will contain a real-time operating system, but could optionally contain a specialized task dispatcher, slicing the available bandwidth among the necessary tasks at hand, including wireless communications management, position determination and management, entertainment radio management, SDARS data demodulation and assessment, power control, and vehicle communications. In the exemplary system, Linux was used as a task dispatcher and provided near real time functionality.

In the normal deployment where the VTUTMD operates as a telematics unit, hundreds of thousands and perhaps as many as 5 million of the VTUTMD devices would provide a level of content delivery useful to a broad range of advertisers. Reasonable quantities can be attained after about two years if a single manufacturer equips all the vehicles in its fleet. Those quantities can be reached sooner if multiple manufacturers participate. Areas of interest are characterized and mapped with road, city and region polygons. Each of these areas of interest is broken into four point polygons (e.g., squares, rectangles, or trapezoids). Each VTUTMD can receive nationwide, or partial downloads based on database size, and the area of interest. In the exemplary system, the continental U.S. is divided into grid squares 1 degree latitude by 1 degree longitude. Each grid square measures approximately 70×50 miles. Each VTUTMD receives, from the digital broadcast stream, segment databases for at least nine grid squares. The VTUTMD determines its latitude and longitude via the GPS. Following the steps of a method described herein, VTUTMD can determine and store information related to a grid square containing the vehicle's location, and surrounding grid squares, north, south, east and west, and northeast, southeast, southwest and northwest, for a total of nine grid squares.

Knowing the desired, and surrounding, grid squares, the VTUTMD monitors the data stream and load of the nine applicable grid squares containing polygons of interest ("polygons") as necessary. Each of these polygons comprises one or more targeted marketing areas that are of interest to advertisers. Recognizing that vehicles are not static and move about the US, the VTUTMD will only update the recognized "home" location once per interval. In the exemplary system, an interval of twenty one days allows a user to travel outside of his home area for a vacation. However, if the vacation stretches to more than twenty one days, the VTUTMD will download and store in a database data corresponding to a new set of applicable grids and begin scanning those data for polygons of interest. In the case of a vehicle traveling out of its normal home location, since it does not have a valid database for the new area, it will not start selective marketing until three weeks have elapsed. Accordingly, the database that receives updates every twenty one days may be referred to as a static database. Thus, the VTUTMD need not constantly update the polygon database. A special exception algorithm causes the VTUTMD to retrieve and update the initial database after three days instead of three weeks for a new deployment.

In certain cases, it may be desirable to update the database more often for vehicles used for vacation travel, for example. In this case, the VTUTMD can download a special, dynamic database, that more frequently updates data and appends it to the standard database as necessary to provide local content for a traveler, advertising restaurants, attractions, hotels or other vacation destinations, for examples.

The VTUTMD merges the nine individual databases that comprise the static database covering a home base grid square, with the special, dynamic, database into a single active searchable composite database. The database contains as many entries as the regions have areas of interest. Each entry contains a polygon containing up to four points. Each polygon entry contains one or more demographic/audio tag combinations. A "wild card" entry allows all vehicles passing into the virtual polygon to have a more generic audio substitution.

Each broadcast containing targeted marketing technology may broadcast "demographic listener estimates" ("DLE"), or demographic codes, that estimate the demographics of a listener based on the broadcast content with which it is associated. Based on a DLE code, and the location of a VTUTMD, content, such as advertisements, can be inserted into the broadcast stream that targets the demographics of the listener. Furthermore, if the DLE does not match a specific message available for a given location, then a more generic message can be delivered to the listener. In lieu of the broadcast containing the DLE, a separate cross reference database can be downloaded to the VTUTMD that references the Channel Number (for satellite SDARS broadcasts), or receive frequency to determine the DLE. Since AM and FM receive frequencies are reused many times, the cross reference database may be a unique part of the appropriate grid square database and when a vehicle is traveling into a particular grid square, it can reference the DLE for that particular grid square corresponding to the receive frequency currently tuned.

An area of novelty described in the present application includes the database, storage and lookup methods, and the relative speed at which a potentially very large database can be searched with a modest processor in the VTUTMD to determine which content to insert into a content stream. As an example, an aspect disclosed herein uses a Linux (Unix-like) operating system.

One feature of Unix, or similar, operating systems uses a set of "C" (the programming language) functions called "NDBM". NDBM functions use a simple hashing function to allow the programmer to store keys and corresponding data in data tables and rapidly retrieve them based upon the assigned key. A major consideration for an NDBM database is that it only stores simple data elements (bytes) and uses unique keys to address each entry in the database. Accordingly, the NDBM functions provide a fast, yet scalable, solution that small processors can process efficiently.

The databases are carefully crafted and organized before being downloaded into the VTUTMD. Based on the 1×1 degree grid square model, the continental U.S. consists of approximately 938 grid squares. Each grid square uses the name of its vertices in forming its name so it is easily identified for any lookup. As an example shown in FIG. 2, the grid square containing some portion of Atlanta, Ga. with an actual location of N33.86050 W084.49288 has the vertices N33.0 W084.0, N34.0 W084.0, N33.0 W085.0, and N34.0 W085.0. One possible naming convention would name the grid square using all four corners of its vertices. However, since we used 1 degree grids, and each grid square starts on a whole number degree boundary, an aspect shortens the name of a grid square to the single coordinate of the most southern and most eastern vertex. Therefore, an aspect can refer to the center grid square in which the specified location in the example lies as "33084". This grid square covers an area of approximately 70×50 miles (depending on latitude), and a database record associated with the grid square via an identifier derived from "33084" includes information related to the corresponding grid square.

Figure 2:
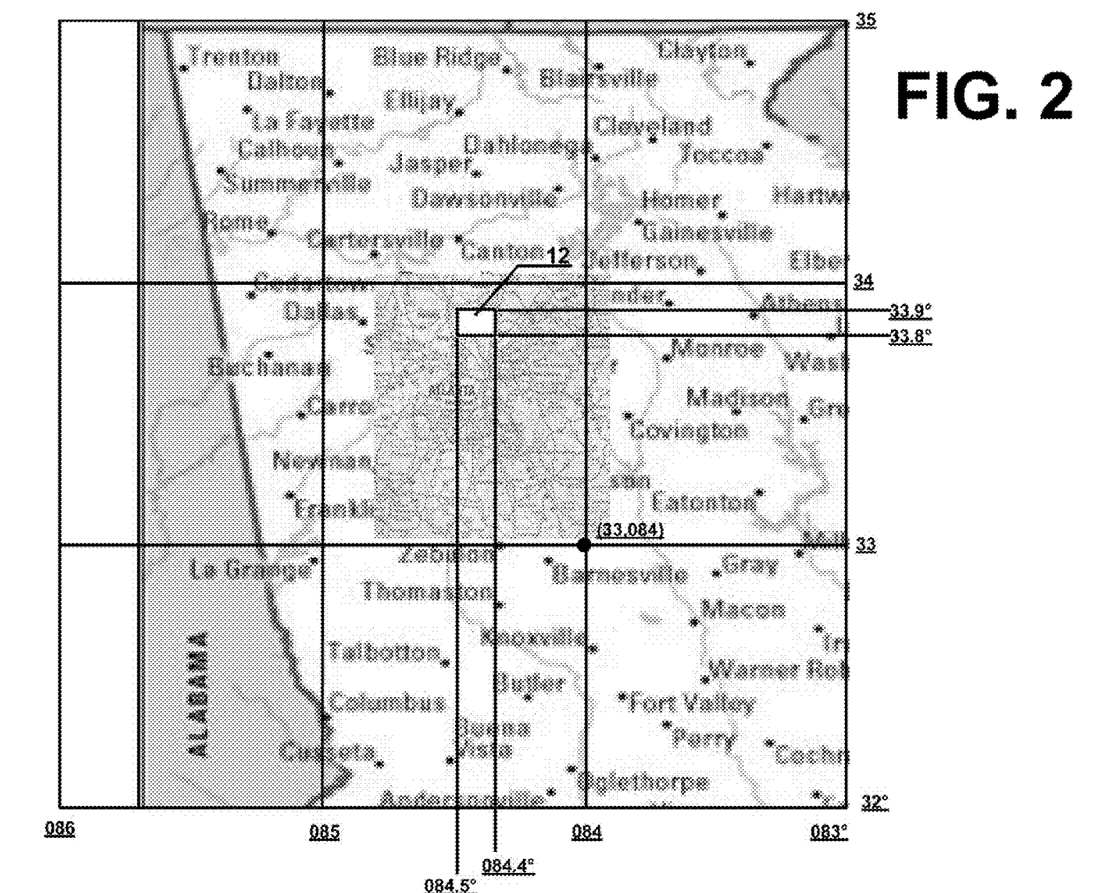
FIG. 2 illustrates an example map showing the coordinates of a quartergrid.

Since a vehicle could reside and normally pass though one or more of the center grid square boundaries, the VTUTMD also downloads and utilizes the database records of the grid squares adjacent to center grid square 33084. The adjacent grid squares are easily determined according to the steps of a method based on the name of the center grid square. Assuming x=33 and y=084, the algorithm may comprise x−1|y, x+1|y, x−1|y−1, x|y−1, x+1|y−1, x−1|y+1, x|y+1, x+1|y+1 where "|" denotes concatenation. Thus, according to this algorithm, the grid squares adjacent to the center grid square 33084 are 32084, 34084, 32083, 33083, 34083, 32085, 33085, and 34085.

VTUTMD 10 monitors an incoming datastream until the center grid square database records and the database records of grids adjacent to it have been received. Each database record is downloaded, stored and tagged according to the time and date by the VTUTMD 10 in non-volatile memory coupled to, or part of, the VTUTMD. VTUTMD 10 searches for special dynamic database data when the vehicle is traveling outside of the area defined by the nine previously captured database records. These special dynamic database records are identified in an aspect by the name of the grid square followed by "S". The 'S' identifies a special transient, or visitor's, content database record.

The database record for a grid square can contain data for polygons of interest (subsequently referred to as polygons) at three different levels. In an example shown in FIG. 2, polygon 12 has coordinates, 33.8, 084.4; 33.9, 084.4; 33.8, 084.5; and 33.9, 084.5. The southeastern most vertex, based on these sets of coordinates is 33.8N 084.4 W. These coordinates are shown in the quartergrid record labeled 338A0844A, in table 14 in FIG. 1. Thus, polygon 12 may be named 338A0844A. Polygon 12 discussed above uses seven digits, but nine characters, to name it; its coordinates each include a digit to the right of the decimal point to provide reference to tenths of a degree, rather than just to the degree of the grid square in which it lies. Use of the character 'A' is discussed in more detail elsewhere herein.

For some rural areas of the country, there may be no polygons, or a minimum number of grid square polygons, which subsequently may be referred to herein as simply a grid. In the case where no polygons are of interest to advertisers, a downloaded database record may not contain advertiser information, or content, but nevertheless may be tagged with a time and date stamp for updating, tracking, and database structure purposes. In cases where a large area includes relatively few polygons, those polygons are presented and addressed directly in the composite database.

A grid can be subdivided into smaller square polygons, referred to herein as quartergrids, superquads, and quads. According to this naming convention, each grid may comprise four quartergrids (2×2), 100 superquads (10×10), or 400 quads (20×20). Dividing a grid's longitude and latitude by tenth of a degree, for example, would result in a superquad identified by its southeastern corner's latitude and longitude coordinates. The corresponding superquad database entry containing aforementioned mentioned GPS location with tenth of a degree granularity, or resolution, would be identified as 3380844 as discussed above.

Since the coordinates of superquad polygon 12 are given in tenths of a degree, the superquad is one one-hundredth of a grid making it approximately 7 by 5 miles. In the most urban areas where there may be many areas are of interest, a superquad can further be divided by four, or better put, a grid can be divided by 400, or to $\frac{1}{20}$ of a degree. In an aspect, this gives database entries the most direct unit of search, a quad, which is approximately 3.5×2.5 miles for polygon 12. A grid, or quad thereof for example, again is identified by its most southeastern corner, in this case 338008440. However, one aspect to consider when deciding to break down a grid for more granularity, and thus better relevance of content associated with a given grid, or subdivision thereof, is the fact that an area may be defined in the database record for each of: the quads, superquads, or quartergrids. Since multiple descriptions of the same information in different records would tend to decrease the number of times a given advertisement would be played to a listener, an advertiser should decide whether the association of given advertisement content with a grid, quarter grid, or superquad, in addition to a quad, makes economic sense. For example, if an advertisement plays when a driver enters a given grid, that same advertisement may not play again when the driver enters a quad that the advertisement content is associated with until other advertisements also associated with the same quad plays, unless the advertiser pays extra for preferential treatment.

As another example, suppose that a vehicle is located in a very dense urban area called Alpha City. The home location of this vehicle is N044.65432 W115.73321. The urban area is ten miles by ten miles and lies in grid 44115. This grid contains many areas of interest, and thus corresponding polygons that are associated with these, areas, points, or establishments, of interest, and thus has the database entries broken down into polygons identified as quads. As the vehicle travels north of Alpha City, there is only one road. That road is an interstate that runs straight through 45115. Grid square 45115 is interesting to advertisers so the database record corresponding to it contains multiple advertisement content corresponding to different advertisers. Directly to the northeast, grid area 46114 contains no areas of interest to the advertisers.

Figure 7:
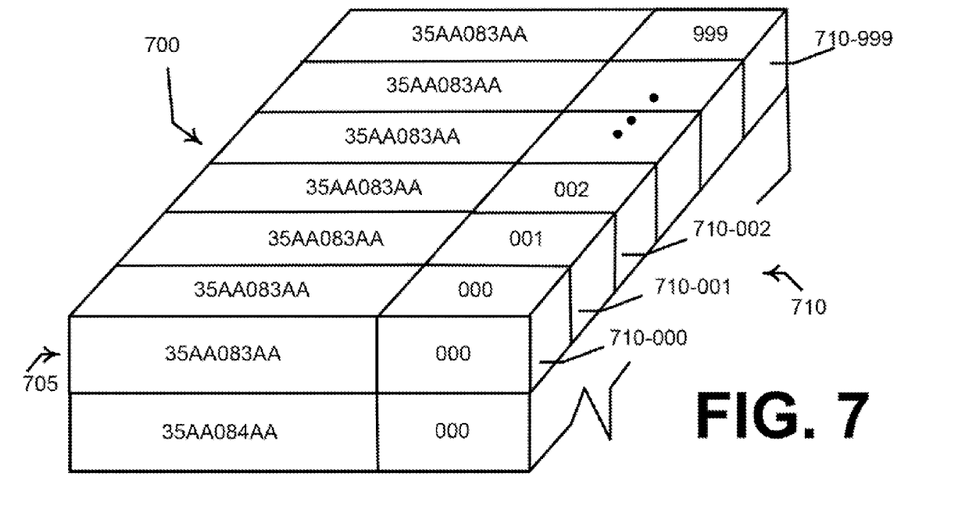
FIG. 7 illustrates a database record structure for associating multiple content files, or addresses thereof, with unique identifiers that correspond to desired polygons.

FIG. 7 shows an example of a subset of the database record 700 corresponding to the grid square containing the home location. Each grid's NDBM record is tagged, or associated with, a 9 byte key, or index value in an index field 705. The index is formed by taking the first two digits (the degrees) of the latitude (latitude values fall between 0 and 90, inclusive) and three digits of longitude (longitude values fall between 0 and 180, inclusive) as shown, and combining them with a hexadecimal digit "A", or "B". This is done because the "A", or "B" does not represent a measure of degrees of either latitude, or longitude. Used as a placeholder so that all identifiers of polygons have the same number of characters as an identifier that represents the smallest polygon (i.e., highest resolution), an "A", a "B" (or other predetermined digit) provides uniqueness in an NDBM database when used to address, or identify, a polygon (superquad, quartergrid, or grid). Thus, the unique identifier for each polygon used as an index, or used as an indentifier in the index field of an NDBM database, contains the same number of characters as the unique identifier of other polygons, regardless of whether it represents a grid, quarter grid, superquad, or quad.

As an example, 35AA083AA represents, or addresses, data associated with a grid square having its southeastern most vertex at 35 degrees north of the Equator and 83 degrees west of the Prime Meridian. However, 350008300 represents, or addresses, a quad having its southeastern most vertex also at 35 degrees north of the Equator and 83 degrees west of the Prime Meridian. Thus, the presence of the placeholder "A" in places to the right of the whole number portions (i.e., 35 and 83) of the polygon identifier indicate the degree of resolution (in other words the size) of the polygon represented.

If the identifier does not contain any "A" characters, then the identifier represents a quad. If the last digit of either the latitude portion or the longitude portion is a "B", the identifier represents a superquad. If the last digit of either portion of the identifier is an "A", the identifier represents a quarter grid. If the last two digits of either portion of the identifier are both "A", then the identifier represents a grid. Alternatively, a "B" in the second place to the right of the decimal place could represent a quartergrid and an "A" in the same location could represent a superquad. Whatever character the method uses should not matter as long as the choice of characters distinguishes between coordinate values for superquads and quarter grids where the fraction portion for each corresponds to one half of a degree.

Furthermore, in an aspect, a polygon indicated by an identifier need not be symmetrical with respect to degrees or subdivisions thereof. A polygon need not be limited to one degree by one degree (a grid), one half of a degree by one half of a degree (quarter grid), one tenth of a degree by one tenth of a degree (superquad), or one twentieth by one twentieth of a degree (quad). For example, the polygon identifier 35AA08300 would represent a polygon having width of one twentieth of a degree east to west, and one degree south to north, and having its most southeastern vertex at 35N 83 W.

In another aspect, the portion of the location coordinate values representing fractions of a degree may comprise three digits rather than two, so that a southeastern vertex representing a superquad can have coordinate values with resolution of one twentieth of a degree, even though one tenth of a degree would define the length of a side of a superquad. A zero digit in the third digit of the fractional portion of a coordinate value could indicate a quad, but a "B" in the third digit could represent a superquad. For example, 35150084850 could identify a quad having its southeaster vertex at 35.150N 84.850 W, whereas 3515B08485B would correspond to a superquad having the same southeastern corner, or vertex. Although the same southeastern vertex would define both the quad and superquad, the superquad would have sides of one tenth of a degree but would be anchored by a southeastern corner having non-even number fractional coordinate values (i.e., 0.05; 0.15; 0.25; . . . 95).

Continuing with discussion of FIG. 7, database 700 uses field 710 to store one, or more, content addresses. However, it will be appreciated that the front value in index field 705 may be a hash of the string 35AA083AA000. The value behind it, as viewed in the figure, would be a hash of the string 35AA083AA001. The addresses can be IP addresses, or memory addresses of a location where a content file is located, stored either locally, or remotely on a remote server. The address in field 710 could also be any other way of identifying the location where the corresponding content, or data, is stored. Field 710 can be two (or more) dimensional, thus making a database including multiple records like record 700 function as a three-dimensional database, or table. If more the one content file is associated with a given geographical polygon (represented by the value in index field 705), then a separate content identifier represents each of the content files in the table as shown by the record blocks 710-000 through 710-999.

Figure 3:
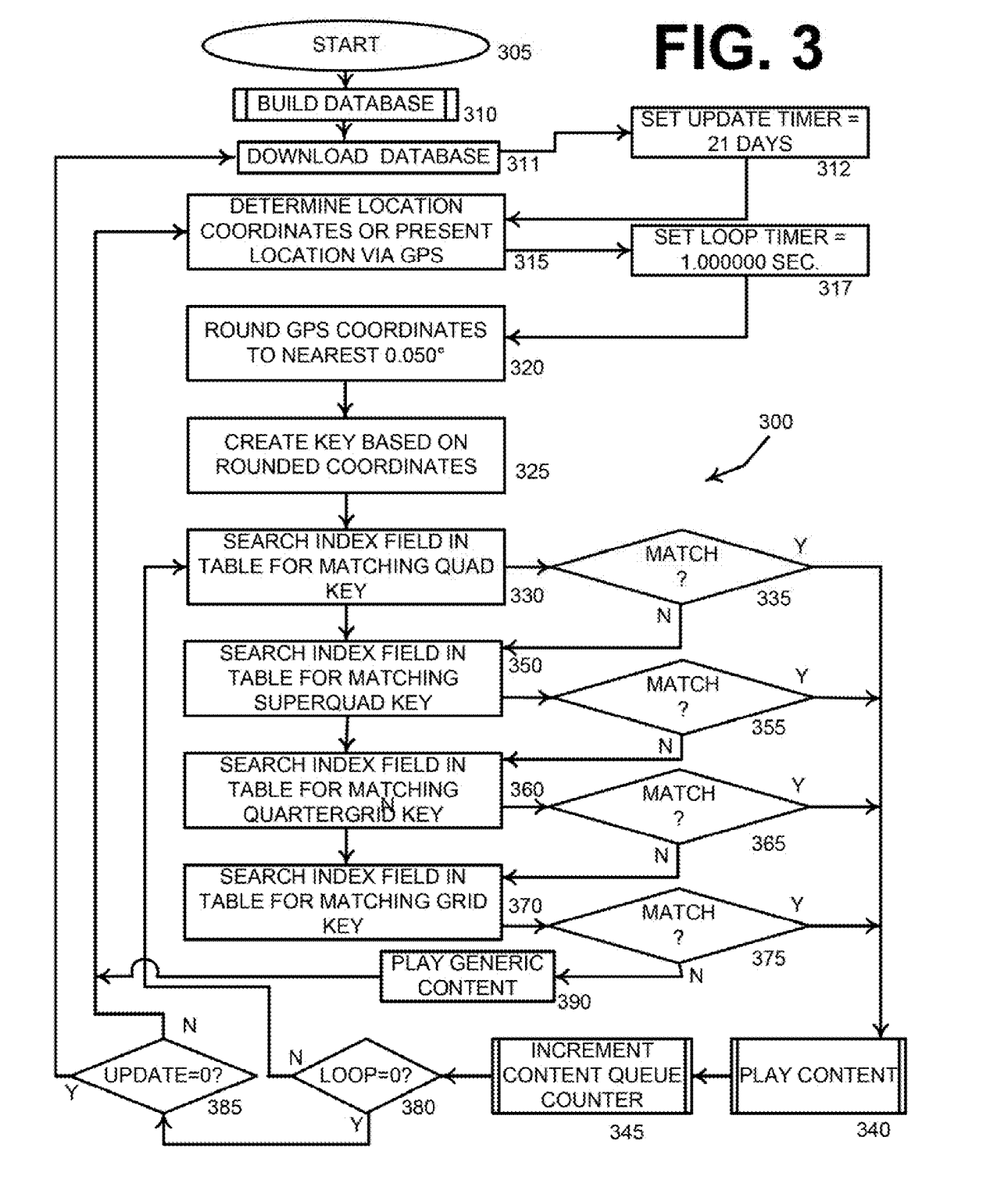
FIG. 3 illustrates a flow diagram of a method for playing content based on the location telematics unit.

Turning now to FIG. 3, the figure illustrates a method 300 running in a VTUTMD for playing content based on the location of a vehicle. Method 300 starts at step 305. An operator of method 300 builds a database at step 310. In building the database, method 300 typically associates advertiser content with a unique identifier, wherein the method forms the identifier from a latitude portion and a longitude portion corresponding to the coordinates of the southeastern most vertex of a particular geographic polygon. As discussed above, the polygon may be a grid, a quarter grid, a superquad, or a quad.

An advertiser for a local restaurant may only want to associate a multimedia content file, an address thereof, or pointer thereto, with the identifier of a quad in which the restaurant is located. Or, the restaurant may want to pay more to associate his, or her, restaurant with the identifiers of the quad it is located in as well as the quads that surround it. On the other hand, an owner of a large chain restaurant may want to associate its advertising multimedia content file with an identifier of an entire grid that contains a large number of its restaurants.

Accordingly, method 300 associates an advertiser's content file, or a pointer thereto, with the identifier of a polygon. The identifier typically also includes a content/data number portion, in addition to the latitude and longitude portion. For example, unless only one advertiser wishes to pay to associate an advertising file with a given polygon, each disparate value for the content number portion corresponds with a respective content file. In an aspect, the content number portion is a three digit number. Accordingly, up to 1,000 different content files could be associated with the identifier in the database table associated with a given polygon. Method 300 initializes a content queue counter to zero when it downloads data to build the database. As each content file is played to a driver during a predetermined period for playing advertising content, the method increments the content queue counter as described in greater detail below in connection with the description of step 345. Preferably, a hash algorithm processes the geographic coordinates and content/data number portion and stores them as unique identifiers, or search keys, into an NDBM database at step 310 to facilitate highly efficient searching thereof.

After method 300 has built a database at step 310, the method downloads database records to the VTUTMD at step 311 based on the coordinates of the VTUTMD's 'home' location, which may be the home address of the owner of the vehicle in which the TMD is installed. The database records downloaded at step 311 typically include static database records, as well as dynamic records if a driver of a vehicle having a given VTUTMD enters a geographical location that differs from his or home base. As discussed above, the dynamic database records would correspond to grids, and their subdivisions, surrounding a temporary location, such as a vacation location. If a VTUTMD remains in a 'temporary' location longer than a predetermined period, for example three weeks, the VTUTMD may deem the temporary location the permanent location and deem the dynamic database records as static records. Method 300 may set an update timer at step 312 to a predetermined period, typically equal to a number of days or weeks. Method 300 may use the update timer to determine when to update the static portion of the composite database with new content. It will be appreciated that method 300 may update the dynamic portion of the composite database even if the update timer has not counted down if the VTUTMD enters a location outside the nine grid squares for which data related thereto composes the static portion of the composite database.

After setting the update timer at step 312, the method determines the current location of the VTUTMD at step 315. Method 300 sets a loop timer at step 317 to a predetermined period used to determine when to acquire and process current location coordinates. Typically, the GPS portion of the VTUTMD can update the location coordinates once every second, so the loop timer may be set to equal one second. But, the transmitting of updated information from GPS satellites can vary. Furthermore, method 300 can direct that the VTUTMD perform the steps of method 300 at any predetermined interval. For example, a user may wish to set the loop timer value higher than one second to reduce processor load. Alternatively, method 300 can automatically cause the loop timer value to reset to different values at different times of the day, or week.

After the VTUTMD determines its location coordinates at step 315, and sets the loop timer, method 300 rounds the coordinate values down at step 320. In an aspect, when rounding down the values of the coordinates of the current location at step 320, method 300 typically stores the coordinates to four different memory portions each in a different format. For example, method 300 may designate a memory portion of the VTUTMD to store a value for use in searching for a matching quad in a future step of method 300. Since quads are one-four-hundredth of a grid, as discussed elsewhere herein, a given coordinate value is rounded down to the nearest one-twentieth of a degree. Thus, the values for the latitude and longitude portions representing the southeastern most vertex of a quad would end in either "0.00" or "0.05" (or "0.000, or "050" if using three digits to represent the fractional portion of coordinate values as described above). Similarly, when processing the current position coordinates, along with an appended content/data number, according to the same hash routine used to build the database at step 310 for use as a search key in searching for a matching superquad identifier in the highly efficient database, method 300 rounds down the current position coordinates to the nearest tenth of a degree and places an "A" in the position that is two places to the right of the decimal point (position to the right of the whole number degree value of a coordinate value).

When method 300 converts the current location position coordinates and counter number into a search term for use in searching the composite database for a matching quarter grid, however, the method rounds the coordinate Values down to the nearest half of a degree and places a B in the position two places to the right of the decimal point. Thus, identifiers in the database for a superquad will differ from entries from a quarter grid when the digit in a coordinate's position one place to the right of the decimal place to is a "5." For example, 345A0835A would represent a superquad and 345B0835B would represent a quartergrid, where each polygon has its southeastern most vertex at 34.5N and 083.5 W.

Finally, when method 300 converts and stores the current location position coordinates at step 325 for use in searching for a matching identifier in the database corresponding to a grid square, the method places two "A" characters, or "AA" to the right of the decimal point before storing the identifier to the corresponding memory portion designated for storing a grid-based search key, or search string.

In the above discussion regarding converting the current location position information to a search string at step 325, method 300 rounds down. Thus, searching for a matching entry in the composite database will result in finding an entry that matches the polygon represented by values related to its southeastern most vertex in which the VTUTMD is located. In addition; the discussion above describes placing an "A" or "B" character in reference to a decimal. However, method 300 does not need to actually place a decimal character in the string it stores to the quad, superquad, quartergrid, and grid memory locations for use in comparing to corresponding polygon entries in the composite database. Reference is made to the location of a decimal for purposes of describing how to handle the identification of polygons of varying levels of precision.

Method 300 stores the rounded values to the corresponding memory portions at step 325. It will be appreciated that values stored in the plurality of memory portions may be stored in the same format that entry values for corresponding key values are stored in the index field of the composite database. For example, an operator of a VIUTMD, or a service provider that provides services through via a VTUTMD, may choose to use an NDBM database, where entries in the index field of the records in the database are the result of a hash algorithm performed on the identifier that comprises the current location coordinates and the filler characters, 'A', or 'B', as discussed above.

At step 330, method 300 retrieves the value stored in the quad key memory portion and appends a "000" to the quad key. It will be appreciated that the "000" could be appended after rounding but before storing at step 325. Further, it will be appreciated that after appending the "000", method 300 performs a hash function on the retrieved value (with "000" appended) using the same hash function that it used in step 310 to build the composite database, as will be describe in more detail elsewhere herein. Method 300 searches the index field of the composite database for a value that matches the quad key search term. Method 300 determines whether a match is found at step 335. If method 300 determines at step 335 that the composite database does not contain a match to the search term corresponding to the value retrieved from the quad key memory portion, the method advances to step 350.

If method 300 determines that a match (matching record) exists in the composite database at step 335, the method advances to step 340 and retrieves content from the composite database (or from a location pointed to by the matching record) that corresponds to the matching database record and plays it according to a subroutine method described in more detail herein. Alternatively, method 300 can perform some other action at step 340; for example, evaluating whether the current coordinate values lie within a polygon defined in the database, or in another database pointed to by the matching record. After playing the content at step 340, method 300 increments the content queue counter at step 345 according to a subroutine method described in greater detail herein.

At step 380, method 300 determines whether the loop timer has counted down. If the determination at step 380 is yes, method 300 advances to step 385 and determines whether the update timer has counted down. If the determination at step 385 is yes, method 300 advances to step 311 and the method repeats as described above.

If the determination at step 380 is no, method returns to step 330 and continues as described above. If the determination at step 380 is yes, method 300 advances to step 385. If the determination at step 385 is that the update timer has expired, method 300 returns to 311 and continues as described above. If the determination at step 385 is no, method 300 returns to step 315, and continues as described above.

Returning to the description of method 300 at step 335, if the method determines that the composite database does not contain a value in the index field matching the hashed result of the quad identifier, at step 350 the method retrieves the search term corresponding to the current value in the memory portion for storing the hashed value corresponding to the superquad representation of the current position of the VTUTMD. Method 300 compares the value retrieved at step 350 with the values in the index field of the composite database to determine if a match therein exists at step 355. If the determination at step 355 is yes, method 300 advances to step 340 and continues as described above. If the determination at step 355 is no, the method advances to step 360.

At step 360, method 300 retrieves the search term corresponding to the current value in the memory portion for storing the hashed value corresponding to the quartergrid representation of the current position of the VTUTMD. Method 300 compares the value retrieved at step 360 with the values in the index field of the composite database to determine if a match therein exists at step 365. If the determination at step 365 is yes, method 300 advances to step 340 and continues as described above. If the determination at step 365 is no, the method advances to step 370.

At step 370, method 300 retrieves the search term corresponding to the current value in the memory portion for storing the hashed value corresponding to the grid representation of the current position of the VTUTMD. Method 300 compares the value retrieved at step 370 with the values in the index field of the composite database to determine if a match therein exists at step 375. If the determination at step 375 is yes, method 300 advances to step 340 and continues as described above. If the determination at step 375 is no, the method advances to step 390 and plays generic content, or performs some other action, before returning to step 315 and continuing therefrom as described above.

Figure 4:
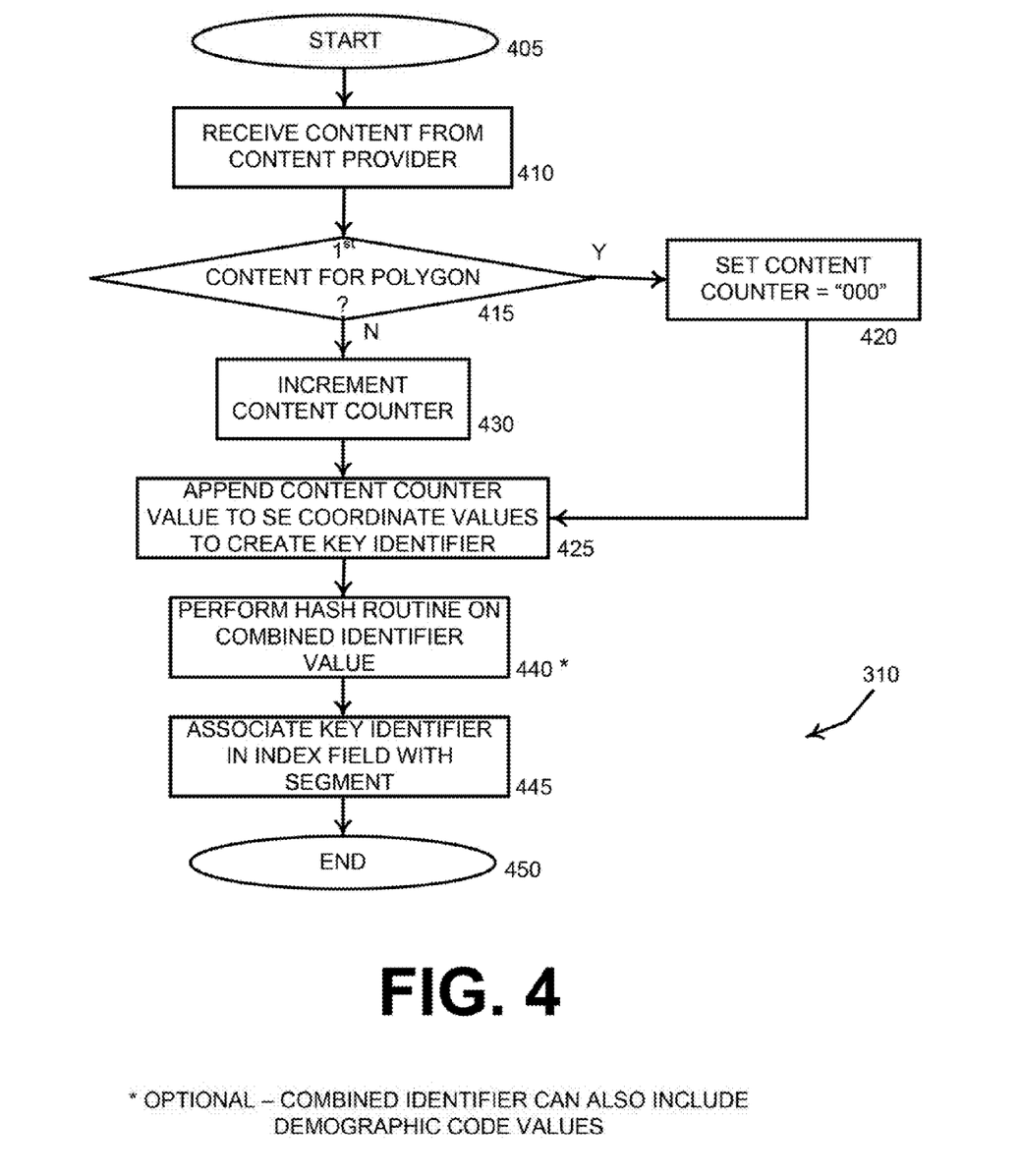
FIG. 4 illustrates a flow diagram of a subroutine method for generating database records for use in a method for playing content based on the location telematics unit.

Turning now to FIG. 4, the figure illustrates a flow diagram showing the steps of subroutine method 310 shown in FIG. 3. Method 310 starts at step 405 when called from step 310 in shown in FIG. 3. At step 410, a telematics services provider ("service provider") receives one, or more, content segments from an advertiser. The advertiser ("content provider") may push the advertisement content via the internet to the service provider. Or, the content provider may transfer the content to the service provider via a computer disc, or other means. Along with a given content segment (e.g., an mp3 file for a fifteen second audio advertisement), the content provider will typically associate geographical coordinates of a particular polygon. The content provider may also associate a code, or codes, that indicates; or indicate, particular demographic characteristics.

At step 415; the services provider evaluates the polygon coordinates of the current content segment and determines (typically using a software program) whether it has received other content segments from content providers that have been associated with the same polygon. If the service provider has not received any other content segments associated with the same polygon, it appends the content counter value "000" to the current segments polygon coordinates at step 425. It will be appreciated that the content provider may have already inserted "A's", or "B's", to indicate the size polygon it wants to associate the current content with. If the content provider has not already inserted A's, or B's" (or other agreed-to characters that indicate polygon size), the content provider should have provided a size polygon it wants to associate the advertising content with. The service provider then creates the identifier of the polygon based on polygon coordinates, and the desired polygon size as requested by the content provider.

Returning to discussion of step 415, if the determination is no (service provider has received content and associated it with the same polygon as the polygon requested for the current coordinates), the service provider increments the content counter at step 430 and method 310 advances to step 425, where it performs the step as described above. After performing step 425 one, or more, time, or times, the service provider has a database that associates a unique identifier with a content file, or another indicator that points to, or addresses, a content file. The service provider creates the unique identifier by appending the content counter value to the description (coordinates and size suffixes) of a polygon. In addition, the service provider appends any codes that indicate a particular demographic group to the polygon description. Thus, the unique identifier associated with a particular content segment file identifies a polygon location, the polygon's size, any preferred demographic group and the incremental sequence number assigned to content for the same polygon to distinguish the content from other content files associated with the same polygon. In addition, in another aspect, the service provider could achieve more than 1000 unique identifiers for content files within a given polygon by assigning content counter values 000 through 999 not only according to a particular geographic polygon, but also for each of a plurality of demographic codes for the given polygon. Thus, for a given polygon, for two different demographic code combinations, the service provider could associate 2000 content files with a given polygon.

After performing step 425, the service provider may optionally apply a hash algorithm to the identifier at step 440. Since the identifier resulting from step 425 could contain many characters (nine characters for geographical coordinates, three characters for content counter value, and more characters for one, or more, demographic codes, a hash result would typically result in fewer characters than the identifier itself, and thus would speed any search that a VTUTMD would perform, as discussed in reference to steps shown in FIG. 3.

Continuing with discussion of FIG. 4, at step 445, the service provider associates the unique identifier, either original identifier, or the result of performing the hash algorithm on the original identifier, with the corresponding content into a database record. Thus, the service provider typically maintains in a master database many database records that associate a unique identifier, which identifies a particular polygon, potentially a particular demographic group, and sequential number to distinguish between multiple entries for a given polygon and given demographic characteristics, with corresponding content. Thus, when a VTUTMD downloads static and dynamic database records at step 311 in FIG. 3, the VTUTMD receives all records from the master database that correspond to the home, and possibly temporary, locations of the VTU, and its owner's demographic characterization. Subroutine method 310 returns to method 300 at step 250.

Figure 5:
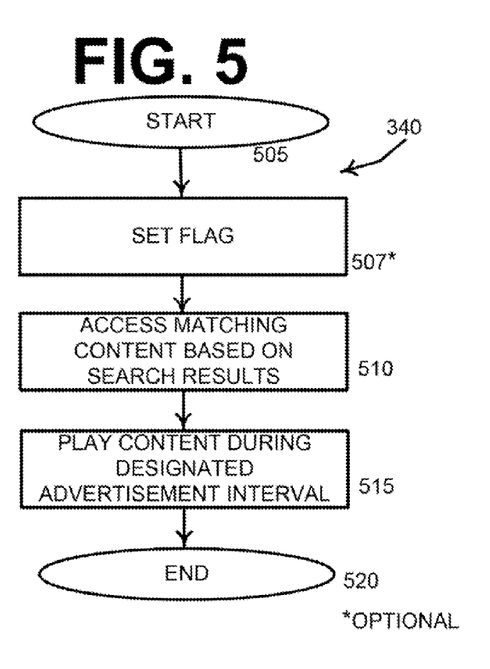
FIG. 5 illustrates a flow diagram of a subroutine method for determining a content file to play.

Turning now to FIG. 5, the figure illustrates a flow diagram of subroutine method 340 of FIG. 3. Method 340 starts at step 505 and sets a polygon size flag at step optional step 507. The polygon size flag indicates which size of polygon the content to be played is targeted at. The flag is set at step 507 based on which of decision steps 335, 355, 365; or 375 from FIG. 3 returned a "Y", or yes, result.

Continuing with description of FIG. 5, method 340 accesses content matching the identifier in the index field from the "Y" match from steps 335, 355, 365, or 375. To access content, the method 340 directs the VTUTMD to access a content file corresponding to a pointer in the record that resulted from the match at either of steps 335, 355, 365, or 375. The pointer could be an IP address, a memory address, or other such means.

The actual content file that corresponds to the matching pointer could reside on, or local to, the VTUTMD. Or, the content file could reside remotely at a server or other storage means accessible remotely from the VTUTMD via a wireless link from the VTUTMD. After accessing the content file, the VTUTMD plays the content file so the user can hear, and possibly see, the file content. It will be appreciated that the VTUTMD will play the content when a break in programming occurs. Typically, an audio, or video stream, broadcast, multicast, unicast, or other form, includes an indicator when an advertisement opportunity occurs. Subroutine method 340 ends at step 520 and returns to method 300 at step 340 as shown in FIG. 3.

Figure 6:
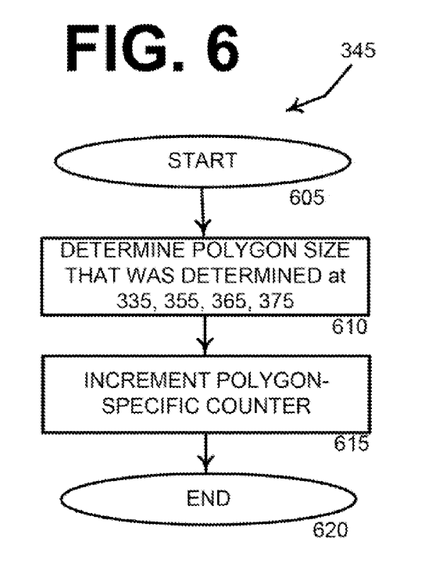
FIG. 6 illustrates a flow diagram of a subroutine method for incrementing a content counter.

Turning now to FIG. 6, the figure illustrates a flow diagram of a subroutine method 345 for incrementing a content counter. Method 300, shown in FIG. 3, calls subroutine method 345 at step 345. Subroutine method 345 starts at step 605 shown in FIG. 6, and determines at step 610 which polygon size was determined from steps 335, 355, 365, or 375 in method 300. As discussed above, this determination may be made at step 507 in method 340. If method 340 did not perform step 507, the operation at step 610 may be to do nothing; if step 507 Was not performed, a generic message may have been played and thus a polygon size was not selected at either of steps 335, 355, 365, or 375. At step 615, method 345 increments a counter specific to polygon sizes. Thus, if a current value in a quartergrid counter is 134, and the most recent iteration of subroutine 340 played a content file corresponding to content counter field 710-134 in FIG. 7, for example, after a 'Y' result from step 365 in FIG. 3, then, method 345 would increment the content counter value for the quartergrid counter, so that the next time step 365 results in a 'Y', step 515 will play content addressed by a value in record 705 that identifies a quarter grid combined with a content counter value of 135 in 710-135 of table 705 shown in FIG. 7. However, if step 507 was not performed, an update to a polygon-specific counter would not typically occur. Method 345 ends at step 620 and returns to method 330 shown in FIG. 3 at step 345.

The following narrative illustrates use of a VTUTMD for inserting targeted marketing content. If a vehicle is parked in the home driveway of its owner and the VTUTMD is attempting to determine if the vehicle is in a targeted segment, the first step is to determine which quad the vehicle is in. The processor in the VTUTMD generates a trial key for the quad based on the GPS coordinates of the current location as shown in the following table:

| Latitude degrees | Rounded Latitude | Longitude degrees | Rounded Longitude | Key |
|---|---|---|---|---|
| 44.65432 | 4465 | 115.73321 | 11570 | 446511570 |

The key can be thought of as comprising a latitude portion and a longitude portion. The latitude portion being the rounded latitude value and the longitude portion being the rounded longitude portion. Before performing a lookup of the database record based on the key, they key may be concatenated with "000."

A lookup based on this key portion concatenated with "000" (the first record corresponding to the quad having a southeast coordinate of 44.65N 115.70 W of the sequence) that yields no results indicates that no content has been associated with the polygon corresponding to these quad-level coordinates. Note that the coordinate values are rounded down to the nearest, and lower, 0.05 degree increment. It is noted that the key value references the quad address based on the addressing plan—referring to a rectangle based on the southeastern most vertex—discussed elsewhere herein.

Next, the processor searches to see if a superquad record exists. The processor in the VTUTMD then assembles a key based on the superquad format:

| Latitude degrees | Rounded down Latitude | Longitude degrees | Rounded down Longitude | Key |
|---|---|---|---|---|
| 44.65432 | 446 | 115.73321 | 1157 | 446A1157A |

This record is established using the values for each of the latitude and longitude coordinates rounded down to the nearest tenth of a degree and with an "A" appended to each coordinate value before concatenating the two groups together. This allows a lookup of a point in the database of a superquad polygon (in other words, a database record's index field value corresponds to a superquad-sized polygon). Accordingly, it will be appreciated that a search preferably starts with the smallest increment of area, the quad, and progresses through a superquad search, then a quarter grid search, and finally a grid search. This allows associating content files with different sized polygons.

Each time a search is conducted for a key based on given geographical location coordinates and polygon size, the search begins searching the database at the beginning segment of each element; i.e., a hash result that is generated from the coordinates, polygon size indicators, and content counter number, which, as discussed above, preferably ranges between "000" and "999". The last search would preferably be at the grid level with the identifier (before appending a value 000 through 999) assembled as shown below:

| Rounded down Latitude | Filler | Rounded down Longitude | Filler | Key |
|---|---|---|---|---|
| 44 | AA | 115 | AA | 44AA115AA |

Based on the key generated concatenated with "000" (the first record of the sequence) (the actual NDBM key will be "44AA115AA000"), the processor addresses the composite database and reads a "0" record. This "0" is the first actual segment associated with the grid.

If the point does reside within the polygon, then the segment key, the polygon identifier, polygon vertices, as well as the DLE and audio segment identifiers, are locally stored for comparison to the DLE received from a currently tuned broadcast stream. If the stored DLE matches the received DLE, then the audio segment identifier identifies a possible audio segment to be played at the next identified insertion point. If the received DLE does not match the stored DLE, then the processor will continue searching the database by incrementing the counter from "000" to "001" to see if a possible match occurs. This allows an area to have multiple demographic types to receive targeted audio content in the same location. Up to 1000 areas (from 000 to 999) are possible per polygon allowing extremely large granularity and large numbers of audio content. Further, with the flexible addressing of areas from a quad to a grid, relatively large areas can be accommodated. It is possible to have content that an advertiser wishes to reach a target within a grid, and stored and received DLEs do not match, but within the same grid, DLE codes stored in the VTUTMD (and thus may be used to generate unique identifiers in the composite database) matches content that an advertiser wishes to apply to a quad. If a quad-level content is not found by searching quad records, The VTU can play grid level content having a content value equal to the corresponding value currently set in the content counter (see step 615 in FIG. 6). Accordingly, the recursive search mechanism where the VTUTP searches until a match is encountered allows multiple levels of substitution for multiple demographic classes.

Figure 8:
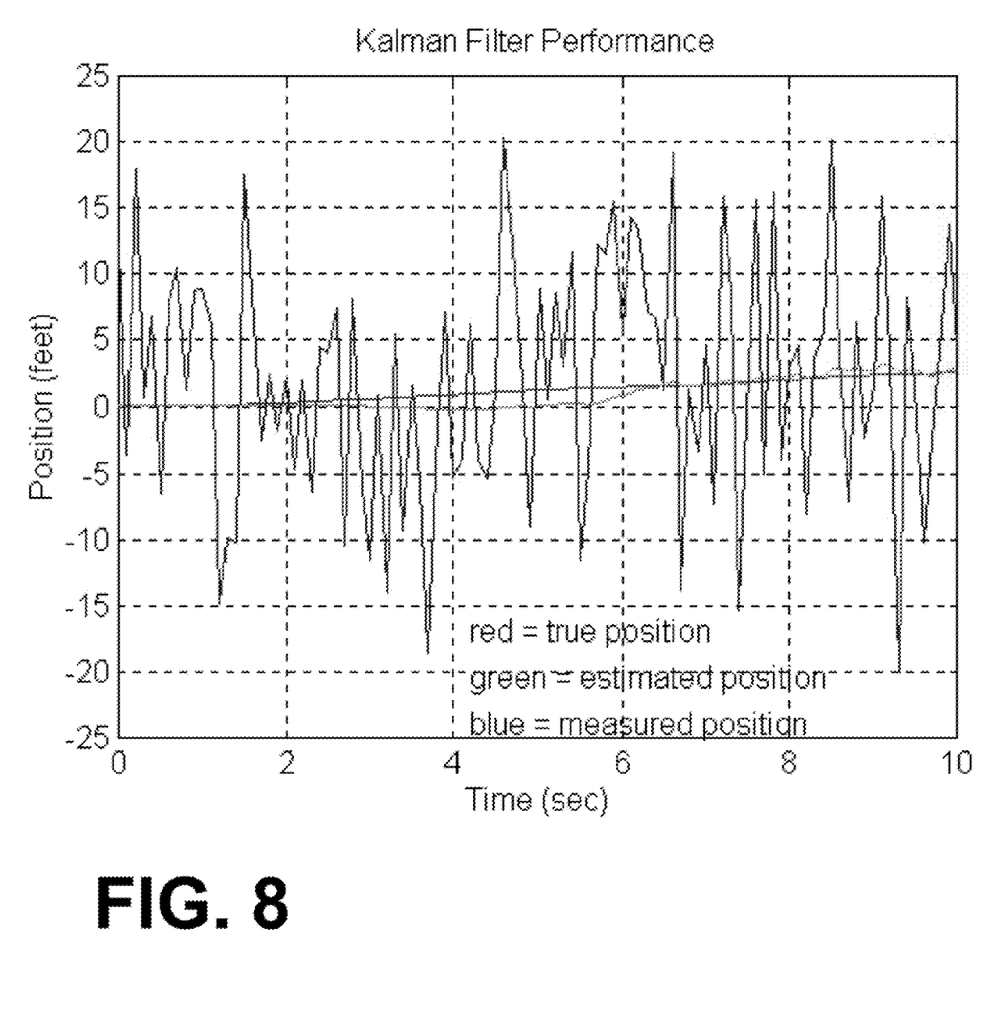
FIG. 8 illustrates a Kalman filter input versus output showing the processing step to stabilize the location of the vehicle using a WAAS equipped GPS.

The GPS resolves the vehicle position once per second and filters the position with a Kalman filtering algorithm, known to those skilled in the art and with outputs shown in FIG. 8.

Audio segments can be compressed audio or text messages that are verbalized using text to speech techniques. Audio segments can be distributed using various methods. Preferred methods include using the broadband data stream to using the alternate audio source as a feed from an IBOC. Any alternate source of audio can be considered and even analog audio sources that are digitized upon reception can be utilized. An example would be to use an analog FM subcarrier channel designed for distribution of alternate audio source, digitized and stored as digital audio segments for replay and insertion into an audio program. Using this technology does have the ability to deliver targeted DLE content for the primary audio channel. Recognizing marketing content (advertising) only occupies a small portion of the hourly content, a terrestrial broadcaster can subdivide his advertising content into many small targeted areas. Further, if implemented correctly, the FM subcarrier could deliver not only the content, but the queue indicating to the VTUTMD that a substitution is necessary.

Based on the preferred implementation, a VTUTMD could include an implementation that applies only to terrestrial or only to SDARS (satellite) or a combination of both. One aspect of interoperation is the queue signals that allow substitution of audio content, whether digitized audio or text to speech, this queue signal indicates the start of content and the length of the content so that the VTUTMD can anticipate the length of the message to be played. Using the methods demonstrated here, audio segment tags are ro assigned six digit numbers that are unique to a specific area of the country (it could be specific to a WalMart parking lot for example by using geographic subdivisions smaller than a quad, like a polygon that is one one-hundredth of a degree latitude by one one-hundredth of a degree longitude, or one ten thousandth of a grid. Even smaller subdivisions could be used for providing content to a user on a personal device while navigating through a shopping mall, or other public place with a high density of commercial establishments, or vendors.

Then once the vehicle, or individual, travels to the specified area, the audio segment identifier identifies the potential segments that may apply to this specific area. Upon first entry to the specified area identified by a change in the audio segment identifier, a content counter is set at "000". Multiple areas defined in the polygon database can identify the exact same audio segment identifier. In the exemplary system, a queue signal broadcast along with the digital audio stream identifies the DLE and length. The combination of the audio segment identifier "012223" plus the DLE "020" plus the length factor expressed as five second increments "012" (sixty seconds) plus a replay flag "000" is concatenated to a single index "012223.020.012.000". If no content exist using the index created, then the audio stream is unmodified from the main distribution. If content is located that corresponds to the indexed value, then the audio substitution will proceed. The replay counter is incremented by one. If the replay counter is incremented to a value other than "000" and no match is located for the audio substitution, then the counter is reset to zero. The index points to a specific audio message from a third message database that is also identified by a six digit field.

The combination of the data bases shall insure that audio content is available and if no content has been downloaded to correspond to the associated segment database, then the counter shall be reset to "000" and another VTUTMD will search for another segment. Recognize that the reception of audio segments generally will happen only during active drive time and the potential for missing specific targeted audio segments for specific DLE is high. This system depends on receiving audio data (segments) and caching those segments for replay at the appropriate time for the appropriate demographic. While it can provide reasonable replacement with "long running" advertisements, it does require some advance planning to allow substitution of content for a "short running" commercial. Certainly higher bandwidth distribution methods support themselves better than a single low bandwidth digitized FM subcarrier, but as long as the single FM subcarrier is only trying to provide replacement content for the associated FM voice channel, the results would be acceptable. Further, with proper management, and limiting replacement content to a specific length say 60 seconds, carefully managing the distribution for specific demographics and managing the distribution to match the drive times of specific regions of the country, satellite audio sources can be very successful with audio substitution.

In another embodiment, in addition to defining a rectangular shape, like a grid or one of the previously discussed subdivisions thereof, a database record can also define a polygon that is not a parallelogram and that has more than four sides.

In view of the foregoing, it will be appreciated that the invention provides reasonable and acceptable method for adding local content to wide area broadcasts. Further, it should be recognized that although the preferred embodiment is to utilize equipment that may have been installed for other purposes, this technology could be developed and installed in a specially designed platform designed specifically for the purposes described. It should be understood that the foregoing relates only to exemplary embodiments of the present invention, and that numerous changes may be made therein without departing from the spirit and scope of the invention as defined by the following claims.

For example, the content, or data, pointed to by the record found by method 300 could include media content to play for advertising purposes. Alternatively, the data that a matching record points to could include the points of a polygon other than one of the four polygons already described (grid, quartergrid, superquad, and quad). If a polygon flag is set in the record, method 300 could perform a 'point in polygon' subroutine to determine if the polygon defined in the database record encompasses the current location of the VTUTMD. If so, method 300 may determine an advertising content file to play based on a subroutine that plays advertisements when the VTUTMD is within the polygon according to a frequency corresponding to how much an advertiser has paid for a a content file to be played. Alternatively, method 300 can report vehicle performance parameters according to predetermined parameter variable names stored as data in the record. For example, the data record could include variable names for speed, braking, acceleration, and location. The information corresponding to the variable names can be retrieved from a vehicle's onboard diagnostic system, from a CAN bus connection, from an OBDII port, or from other similar means for supplying vehicle diagnostic and performance information. After retrieving performance information from the vehicle, method 300 can transmit the performance information wirelessly to a central computer for processing. The central computer can process the received information for use in reporting and predicting current and future traffic conditions. For example, the central computer can synthesize the information from many vehicles in a given metropolitan area, for example, and report current traffic conditions to a given subscriber for a preferred, as well as for an alternate, route from point one location to another. Thus, rather than just viewing traffic conditions for major roadways from a helicopter and reporting them on a broadcast radio station every five to seven minutes, a subscriber can obtain instant and current conditions for all roads, rather than stale traffic condition information for roads he, or she, may not even plan to follow from one point to another.

In an aspect, the NDBM database has an index field, with the values in each of its records being a hashed version of coordinates describing a grid or subdivision thereof as described above, and perhaps an appended three digit value that provides the ability to associate multiple records with the same coordinates. Hashing the coordinates and the three digits provides a unique identifier.

The information associated with the unique identifier is preferably a data pointer, or number, or address, that points to a data record in a second database. This second database (the NDBM database being the first database) may not be an NDBM database, but instead a two dimensional table. The information associated with a record matching the data pointer may include points of a polygon (of any shape, not just rectangles), a polygon flag, and perhaps a content pointer, or address, that points to a record in a third database. The third database may also be a non-NDBM database table. Content associated with a given content pointer may include to a content file, such as, for example, an .mp3 file that contains advertising audio, or an .mpg file that contains video. One skilled in the art will appreciate that the file types described herein can change over time. Indeed, over the course of the term of a patent that may issue based on this application, different forms of storing and retrieving content and data may exist that do not exist at the time of this writing. However, the basic concept of using a device's current location coordinates to form a search term, efficiently searching a database for content associated with the current location, and playing that content at a predetermined time, or periodically uploading performance information related to a vehicle, will work regardless of the means and methods for storing and retrieving information.

What is claimed is:

1. A method for operating a vehicle telematics services provider's central computer, comprising:
    receiving data corresponding to one, or more, vehicle performance parameters from one, or more, telematics devices corresponding to one, or more, respective vehicles;
    processing the data received from the one, or more, telematics devices to determine current traffic conditions within a geographic area defined by a polygon that encompasses geographic coordinates of the one, or more, vehicle's, or vehicles', telematics device, or devices; and
    reporting the traffic conditions to one, or more, user devices as media content;
    wherein the one, or more, vehicle's, or vehicles', telematics device, or devices, each transmitted the data corresponding to the vehicle performance parameters after performing a method comprising the steps of:
        determining values of non-fixed coordinates of a geographic location of the respective telematics device substantially located at the same location as the vehicle corresponding to the telematics device;
        creating a unique identifier derived from the values of the non-fixed coordinates; and
        associating the unique identifier with the vehicle performance parameter data before transmitting it with the associated vehicle performance parameter data to the central computer, and
    wherein the performance parameters may be one or more of a group of parameters that incudes vehicle braking, vehicle forward acceleration, vehicle lateral acceleration, and vehicle speed.

2. The method of claim 1 wherein the values of non-fixed coordinates are rounded down to the nearest five one hundredths of a degree before being associated with the vehicle performance parameter data.

* * * * *